Dec. 1, 1931.  W. J. ETBAUER  1,833,895
TRACTOR GUIDE
Filed July 3, 1930  2 Sheets-Sheet 1

INVENTOR.
WILLIAM J. ETBAUER
BY
Irving L. McCathran
ATTORNEYS.

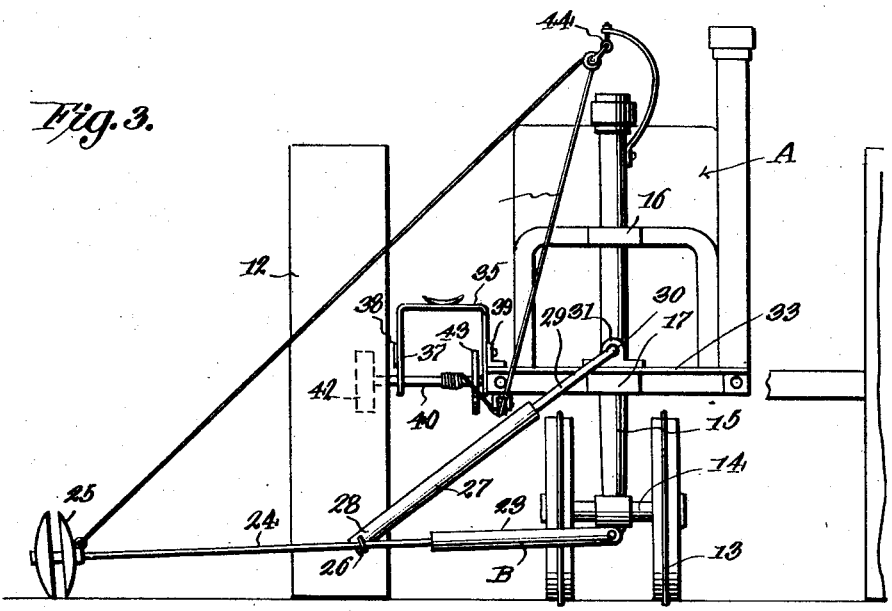

Patented Dec. 1, 1931

1,833,895

UNITED STATES PATENT OFFICE

WILLIAM J. ETBAUER, OF GANN VALLEY, SOUTH DAKOTA, ASSIGNOR OF ONE-HALF TO WALTER W. GRAY, OF GANN VALLEY, SOUTH DAKOTA

TRACTOR GUIDE

Application filed July 3, 1930. Serial No. 465,745.

This invention appertains to tractors and more particularly to attachments therefor for facilitating the guiding of the tractor down a field relative to the previously plowed furrows, so as to insure the proper spacing and forming of all of the furrows.

One of the salient objects of my invention is to provide a novel guide connected with the steering wheels of the tractor, the guide carrying means for engaging the last furrow plowed, so that the steering wheels will be effectively guided relative to said previously plowed furrow, means being provided for permitting the automatic raising of the guide into and out of operative position relative to said furrow.

Another important object of my invention is the provision of novel means for connecting the guide both with the swinging steering wheels of the tractor and with the frame of the tractor whereby the guide can be swung on either side of the tractor to an operative position relative to a previously plowed furrow, without changing any of the parts of the guide or disconnecting the same in any way from the tractor.

A further object of my invention is the provision of novel means for forming the guide itself whereby the guide can be initially adjusted to conform to the spacing of the furrows.

A still further object of my invention is to provide a novel tractor guide, of the above character, which will embody a minimum number of parts, which will be durable and efficient in use, one that will be simple and easy to manufacture, and one which can be placed upon the market and incorporated with a conventional tractor at a minimum cost.

With these and other objects in view, the invention consists in the novel construction, arrangement and formation of parts, as will be hereinafter more specifically described, claimed, and illustrated in the accompanying drawings, in which drawings:

Figure 3 is a fragmentary front elevation of a tractor showing my improved attachment incorporated therewith, parts of the tractor being shown broken away.

Figure 4 is a detail fragmentary perspective view illustrating my novel control for raising and lowering the tractor guide.

Referring to the drawings in detail, wherein similar reference characters designate corresponding parts throughout the several views, the letter A generally indicates a tractor and B my improved attachment therefor.

Figure 1:
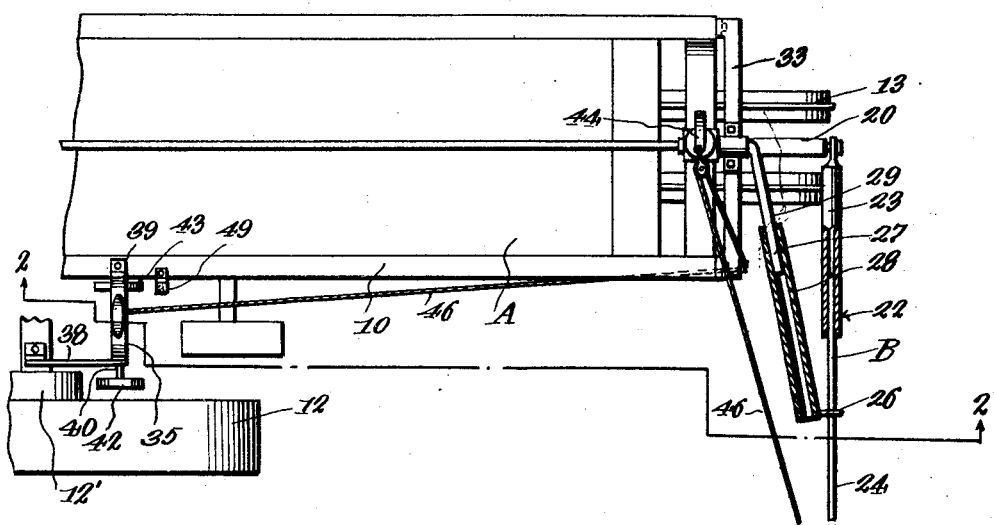
Figure 1 is a fragmentary top plan view of a tractor showing my improved guiding device therefor incorporated therewith, parts of my device and part of the tractor being shown broken away and in section.
Figure 2:
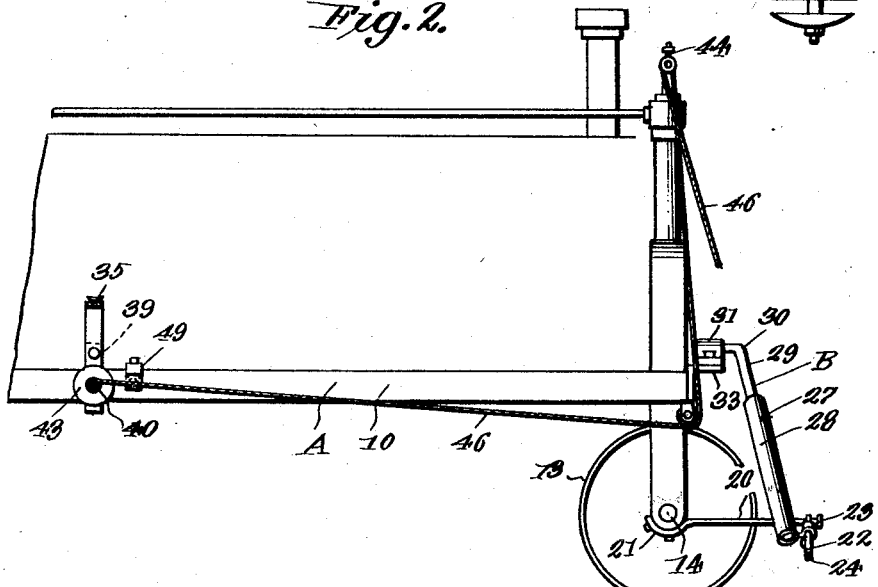
Figure 2 is a section taken on the line 2—2 of Figure 1 looking in the direction of the arrows.

The tractor A is of a conventional type and can be of any preferred make or size and as shown the same embodies a frame having side channel bars 10, rear drive ground wheels 12, and front steering wheels 13. The steering wheels 13 are rotatably mounted on a front steering axle 14 carried by a standard 15 forming a part of the frame of the tractor. This axle 14 is controlled manually by the operator of the tractor in any conventional manner. The rear wheels 12 are provided with brake drums 12′.

My improved attachment B comprises a main supporting bar 20 rigidly secured as at 21 to the swinging axle 14 of the guide wheels 13. The outer end of the supporting bar 20 has rockably mounted thereon the main guide arm 22 which can be of a telescoping nature. As shown, the same embodies the inner tubular section 23, which is mounted for vertical swinging movement on the bracket or bar 20 and the outer sliding section 24 which carries the guide disc 25 for engaging in the previously formed furrows. If desired, means can be provided for holding the section 24 against sliding in the tubular section 23. Slidably connected with the main guide arm 22 by means of an eye 26 is the supporting arm 27 which can also be of a telescoping nature including the outer tubular section 28 and the inner section 29. The outer end of the tubular section 28 swivelly carries the guide eye 26 which engages the guide arm 22. The inner end of the inner section 29 is provided with an angled rod 30 rockably mounted in a suitable bearing 31, carried by the plate 32, which plate is bolted or otherwise secured to a supporting bracket or bar 33. The supporting bracket or bar 33 has its opposite ends bolted to the front end of the tractor frame. By the construction so far, it can be seen that the guiding device swings with the front axle 14 and that when the guide discs 24 are in their lowered position and in engagement with a previously plowed furrow, that the axle 14 will be moved with the disc 25 as the same follow the furrow.

In order to permit the raising and the lowering of the guide arm 22 I have provided novel means operable from a rotatable part of the tractor. This means embodies an inverted U-shaped frame 35 including a top bar 36 and depending legs 37. The legs are rockably mounted on supporting brackets 38 and 39 carried by the tractor frame. The swinging frame 35 is located adjacent to the driver's seat and the top bar 36 may constitute a foot rest for the driver for rocking said frame on the shaft. The arms 37 of the frame rotatably supports an operating shaft 40. The shaft 40 has likewise keyed or supported thereto a friction drive wheel 42 and a brake wheel or drum 43. Secured to an elevated part of the tractor, such as standard 15, is a guide pulley 44 and a lower guide pulley 45 mounted on a vertical pivot is secured to the front bar 33. A hoisting cable 46 is trained over the pulleys 44 and 45 and is secured at its forward end as at 47 to the bar 24 adjacent to the disc 25. The rear end of the cable is wound over the shaft 40 as shown. By this arrangement, when the shaft 40 is turned in a clockwise direction the cable will be wound thereon and the guide arm will be raised to an elevated position above the ground permitting the free traveling of the tractor from one field to another.

When it is desired to rotate the shaft 40 in a clockwise direction the top bar 36 of the frame 35 is rocked forwardly so as to bring the drive wheel 42 in driving engagement with the periphery of the brake drum 12' of the drive wheel 12 of the tractor. This will automatically rotate the shaft and consequently raise the guide arm 22. When it is desired to permit the lowering of the guide arm the top bar 36 is rocked forwardly, which brings the drive wheel 42 from out of engagement with the brake drum of the drive wheel 12 and the brake wheel or drum 43 into frictional contact with the brake shoe 39 secured to the frame of the tractor. The guide arm will swing to its lowered position by gravity and the engagement of the brake drum or wheel 43 with the brake shoe 39 secured to the frame of the tractor. The guide arm will swing to its lowered position by gravity and the engagement of the brake drum or wheel 43 with the shoe 49 will prevent the too rapid descent.

From my construction, the guide arm 22 can be raised to an extreme vertical position and will not interfere in any way with the swinging of the axle 14 during the ordinary travel of the tractor. Likewise the guide arm 22 can be swung to either side of the tractor without changing any of the parts or disconnecting the same in any way from the tractor.

From the foregoing description, it can be seen that I have provided an exceptionally simple and novel device for facilitating the guide of the tractor during the plowing operation.

Changes in details may be made without departing from the spirit or the scope of this invention, but:—

What I claim as new is:

1. The combination with a tractor including a frame, rear drive wheels for the frame, an axle connected with the frame for swinging movement, rotatable ground engaging wheels mounted on the axle, of means for steering the axle comprising a bracket movable with the axle and projecting forwardly therefrom arranged in the longitudinal center of the tractor, a bracket rigidly connected with the frame of the axle, a bearing connected with the last named bracket and mounted directly above the first named bracket, a guide arm rockably mounted on the first bracket for swinging movement on one side of the tractor or the other, a supporting arm slidably and swivelly connected with the guide arm having an angled inner end rockably mounted in the swivelled bearing, furrow engaging discs carried by the outer end of the guide arm, and means for raising and lowering the guide arm.

2. In combination with a tractor including a frame, an axle connected with the frame for swinging movement, wheels supporting said axle, of means for steering said axle comprising a forwardy projecting bracket movable with the axle, arranged in the longitudinal center of the tractor, a guide arm rockably mounted upon said bracket for swinging movement on one side of the tractor or the other, a supporting arm slidably engaging said guide arm, each of said arms being longitudinally adjustable, means for connecting said supporting arm to said frame, and furrow engaging discs carried by the outer end of said guide arm.

In testimony whereof I affix my signature.

WILLIAM J. ETBAUER.